(12) United States Patent
Elharrar et al.

(10) Patent No.: US 11,782,885 B2
(45) Date of Patent: Oct. 10, 2023

(54) ACCESSING S3 OBJECTS IN A MULTI-PROTOCOL FILESYSTEM

(71) Applicant: VAST DATA LTD., Tel Aviv (IL)

(72) Inventors: Yair Elharrar, Tel Aviv (IL); Hadar Hen-Zion, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 133 days.

(21) Appl. No.: 17/452,983

(22) Filed: Oct. 29, 2021

(65) Prior Publication Data
US 2023/0133562 A1    May 4, 2023

(51) Int. Cl.
G06F 7/00        (2006.01)
G06F 16/185      (2019.01)
G06F 16/11       (2019.01)
G06F 16/182      (2019.01)

(52) U.S. Cl.
CPC .......... *G06F 16/185* (2019.01); *G06F 16/122* (2019.01); *G06F 16/1824* (2019.01)

(58) Field of Classification Search
CPC ... G06F 16/185; G06F 16/1824; G06F 16/122
USPC .......................................................... 707/706
See application file for complete search history.

(56) References Cited

U.S. PATENT DOCUMENTS

| | | | | |
|---|---|---|---|---|
| 8,533,231 | B2 * | 9/2013 | Aizman | G06F 16/182 707/827 |
| 9,910,685 | B2 * | 3/2018 | Desineni | G06F 9/54 |
| 10,747,724 | B2 * | 8/2020 | Sergeev | G06F 16/1744 |
| 11,516,158 | B1 * | 11/2022 | Luzhnica | G06F 40/30 |
| 2018/0203744 | A1 * | 7/2018 | Wiesmaier | G06F 9/505 |

* cited by examiner

*Primary Examiner* — Isaac M Woo
(74) *Attorney, Agent, or Firm* — Reches Patents

(57) ABSTRACT

A method for supporting files names in a storage system, the method may include receiving a first protocol request for creating an object having a requested object name that comprises one or more sets of slashes, wherein the first protocol does not use the one or more sets as hierarchy separators; wherein each set of slashes comprises one or more consecutive slashes; determining a role of each set of the one or more sets in a second protocol that uses slashes as hierarchy separators; and generating a path name for accessing the object, when using either one of the first and second protocols, wherein the generating is based on the requested object name and the role of each set.

24 Claims, 3 Drawing Sheets

US 11,782,885 B2

ACCESSING S3 OBJECTS IN A MULTI-PROTOCOL FILESYSTEM

TECHNICAL FIELD

The present disclosure generally relates to the field of data storage, and more particularly to support multiple protocols.

BACKGROUND

S3 or Amazon Simple Storage Service is a service offered by Amazon that provides an object storage that is composed of buckets and objects, where the buckets are containers and the objects are organized into the buckets. Amazon S3 has a flat structure instead of a hierarchy that is being used by file systems. Each bucket can accommodate unlimited number of objects, and each object is identified by a unique, user-assigned identifier.

S3 protocol is an application programming interface (API) that allows applications to communicate with Amazon s3 buckets, and include commands for: creating a bucket, uploading objects to the bucket, retrieve data from S3 storage, etc. The S3 protocol has become the de-facto standard for object storage communication.

Unlike traditional filesystem protocols, S3 allows an object name to include slashes ("I"), while filesystem protocols interpret slashes as separators between directories along hierarchies indicated in file pathnames, where a slash may serve as a separator between two directories in two adjacent hierarchies, or between a directory and a filename in the lowest directory. Furthermore, S3 allows more than one consecutive slashes in an object name, which is an illegal format in filesystem protocols that treat the slashes as special characters.

There is a growing need to support S3 in a storage system that is filesystem compliant.

SUMMARY

There may be provide a storage system, a method and a non-transitory computer readable medium for supporting multiple protocols.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
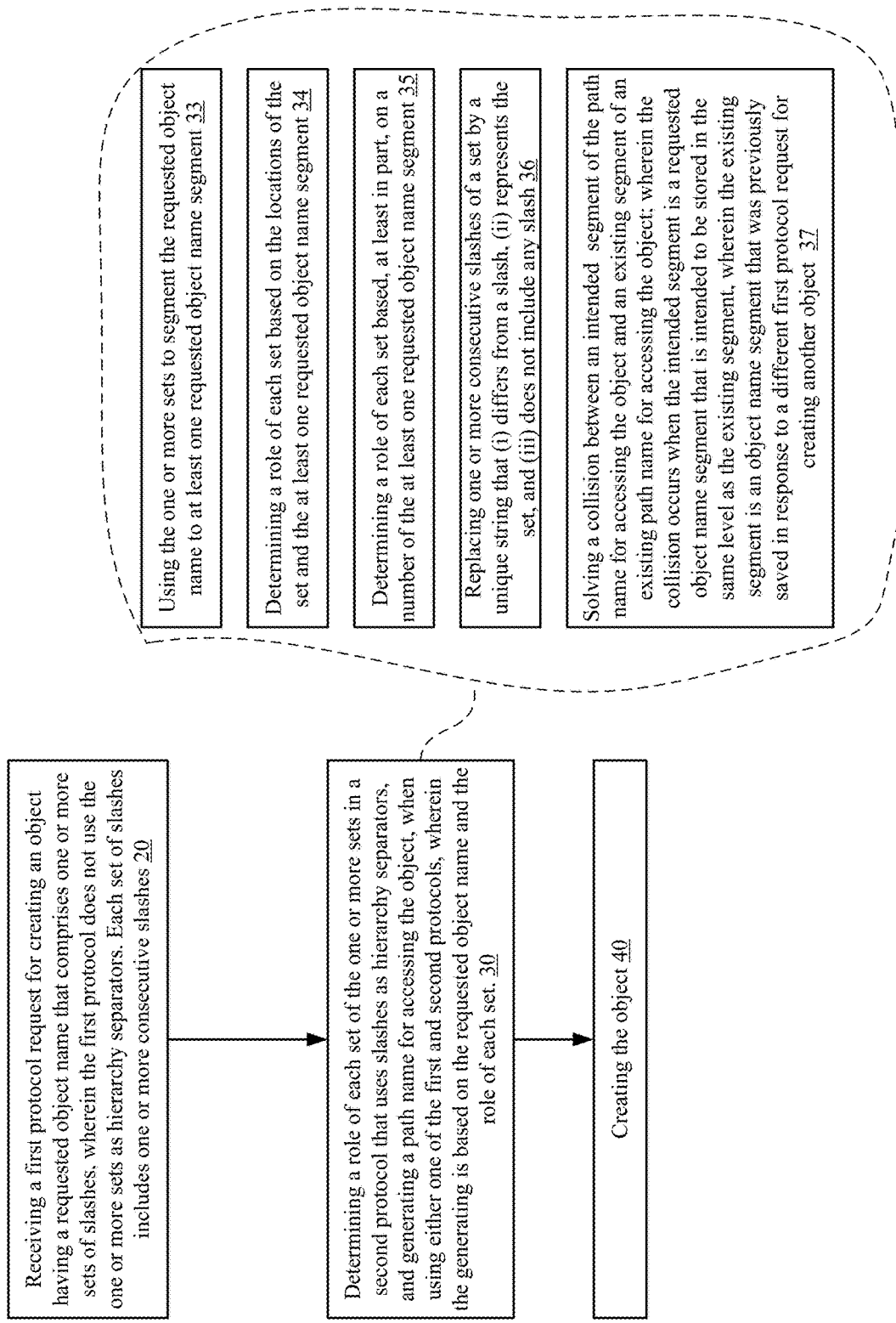
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, methods and non-transitory computer readable medium for accessing the storage by using multiple protocols that differ from each other. A first protocol (for example S3) does not use slashes as hierarchy separators. A second protocol (for example a hierarchical filesystem protocol such as NFS or SMB) does use slashes as hierarchy separators, i.e., for separating directory names of different hierarchies along the path.

For simplicity of explanation—it is assumed that the first protocol is S3.

The storage system is configured to handle access requests from S3 users that utilize S3 interface for accessing an object store, as well as handling access requests from filesystem users, that utilize traditional hierarchical filesystem protocols, such as NFS and SMB, for accessing files in a hierarchy structure.

The S3 users and the hierarchical filesystem users may access the same stored data, that is presented as flat objects to the S3 users and as hierarchical pathnames to the hierarchical filesystem users. Both the objects' buckets and files in hierarchical directory paths are stored by using the same data structures of the storage system.

According to embodiments of the present invention, the system can receive S3 requests from S3 users for creating S3 objects having object names that include slashes as part of the object name, and can utilize the same hierarchical data structures that is used for implementing trees of filesystems accessed by filesystem protocols (e.g., NFS, SMB), for serving S3 object accesses as well as file accesses by the traditional filesystem protocols.

According to further embodiments of the invention, the storage system enables hierarchical filesystem users to subsequently access the data and metadata of objects that were created by S3 users, over a standard filesystem protocol, even when the object name includes slashes (that are not intended, by the S3 user to indicate hierarchy).

The storage system employs a mechanism, for supporting slashes as acceptable characters within the object name. Examples of object names that would not have been considered as valid if not treated according to embodiments of the invention, includes: objects names starting with or ending with a slash (e.g., '/a', 'a/'), and objects names with multiple slashes (//a, a//, a//b, a///).

When the storage system receives a S3 request, from a S3 user, for creating a new object, having a requested object name specified in the request, the object name will be scanned for detecting whether it includes slashes. If the object includes slashes, then instead of creating a file in the current location (directory) with the requested object name, the requested object name will be parsed, and split to one or more name portions, wherein the name portions are strings separated by one or more slashes in the requested object name. The slashes are omitted from the name portions, and replaced by a special purpose string that indicates the existence of the slash in the name and the number of consecutive slashes. For example, a sequence of '///' in a requested object name may be replaced by a special purpose string that indicates a presence of three consecutive slashes, e.g., 'SLASH3', OR 'slashslashslash'

The name portions (if more than one is identified) will be handled as if these portions are directories in a hierarchical pathname, and a corresponding pathname will be created. When a subsequent access request is received from a filesystem user that uses a filesystem protocol or from a S3 user, the pathname will be followed to obtain the content in the leaf of the pathname.

The following examples are object names that may be received from a S3 user, and the way a corresponding file will be created in the system. It is noted that the single quotation marks are used herein only for enclosing the string and are not part of any name.

First Example—User Object Name: 'ab/'

Since beside the ending slash, only one name portion (besides any separation characters) can be identified, it is handled as a file name with no hierarchy. Therefore, a file is created in the current location that was requested for creating the object, and the file is named, for example, 'abSLASH' or any other a name having any combination of the name portion without the slashes, i.e., 'ab', and a valid string that is indicative of a presence of a single slash that was replaced by the valid string.

Second Example—User Object Name: '/ab'

Since besides the starting slash, only one name portion can be identified, it is handled as a file name with no hierarchy, in a similar manner to the case described in a). Therefore, a file is created in the current location that was requested for creating the object, and named, for example, 'SLASHab'.

Third Example—User Object Name: '//ab///'

Since beside the multiple slashes at the start and the end of the string, only one name portion can be identified, it is handled as a file name with no hierarchy. Therefore, a file is created in the current location that was requested for creating the object, having a name that indicates the original name portion 'ab', an indication for two leading slashes and three trailing slashes, for example: 'SLASH3abSLASH2.

Fourth Example—User Object Name: '//c//b'

When there are more than one name portions: a directory is created for each name portion, besides the last name portion (e.g., the one that corresponds to the most right portion in the requested object name, or the last to be parsed), wherein the directory's name is the name portion.

Finally, a file is created under a hosting directory, which may be either the lowest directory that was created, or the current directory when there is only one name portion, wherein the file is named with the last name portion. The file stores the data of the object requested to be created.

In this case, two name portions (that lacks separation characters) are identified, the last portion will be served as a file that holds the content of the object to be stored, and any name portion other than the last portion will be interpreted as a directory.

In this example, a first level directory will be created and assigned with the name, e.g., 'SLASH2cSLASH2'. The name includes the string 'c', a leading special purpose string that indicates two leading slashes and a trailing special purpose string that indicates two slashes.

The next name portion is also the last name portion, and therefore will be considered as a filename 'b' that is hosted under the previous directory level, i.e., under the created directory 'SLASH2cSLASH2'. The file 'b' will store the content of the created object '//c//b'.

Alternatively, the created directory 'SLASH2cSLASH1', i.e., indicating only one slash after the 'c' instead of two slashes, and the last slash may be interpreted as a hierarchy separator.

Fifth Example—User Object Name: a/b/c/

In this case, three name portions (that lacks separation characters) are identified, the last portion will be served as a file that holds the content of the object to be stored, and any name portion other than the last portion will be interpreted as a directory, wherein each directory is created under a directory named by a previous name portion. In this case, a first level directory will be created and assigned with the name 'a'. There is a single slash after the 'a' and therefore it can be served as a hierarchy separator and not as part of any name. A second level directory will be created under directory 'a' and assigned with the name 'b'. The last portion will be a file that is created under the directory 'b' and hold the content of object 'a/b/c/'. The file is assigned with the name 'cSLASH1' to indicate the name portion 'c' that is followed by a single slash.

Sixth Example—User Object Name: /d//b//c//

This case is similar to case e), except the first level directory is named 'SLASH1dSLASH1' (note that the second slash after the 'd' serves as a real separator), the second level directory is named 'bSLASH1', and the file is named 'cSLASH2'.

In the examples of cases d) and f), any excess consecutive slashes (above one) are added to the name portion that preceded the slashes. However, the excess consecutive slashes may be otherwise added to the name portion that succeeds the slashes. For example, in this case, the first level directory may be named 'SLASH1d', the second level directory may be named 'SLASH1b', and the file may be named 'SLASH1cSLASH2.

The above solution may lead to conflicts when an object name of an object to be created via S3 is the same as a name of a hierarchy where the object is to be stored. For example, the user creates a first object named 'a/b' and then creates a second object named 'a'. Upon a creation of the first object, the system creates a directory 'a', where a file 'b' is created.

When the user requests to create the second object named 'a' in the same location as the first object 'a/b', in terms of S3, these are completely different names to be saved in the same level when looking from the user's viewpoint. However, the name 'a' already exists in this location but as a directory. Therefore, in this case where a conflict occurs between a file name and a directory name, in the same hierarchy, there is a need to distinguish a file and a directory having the same name.

According to an embodiment of the invention, if the hosting directory already includes a stored entity (e.g., directory) having the same name as the last name portion of the requested object name, then—the last name portion is further modified to includes a special purpose string that indicates a name duplication, i.e., that the file name has the same name as another stored entity.

For example, when the object 'a' is to be created, and there is a directory 'a' in the same location, a file is created with a special name, where part of the special name indicates the original name portion, e.g., 'a', and other part of the special name is a string that indicates that the name has a conflict in the current hierarchy, for example 'aFILENAME', where the string FILENAME after the original name 'a' indicates that this is a file that should be treated as if it is named 'a'. Alternatively, the file may be created under the directory named 'a', with a special name that indicates that the file has the same name as the directory that hosts it and is actually resides in the same level as the directory.

As for another example with a reversed flow, the user creates an object named 'a' and then creates a second object named 'a/b'. The system cannot create a directory 'a' since this location already includes a file with the same name. In this case, a directory with a name 'aDIRNAME' is created, to indicate that the real name of the directory is 'a'.

When a user (S3 or filesystem user) tries to access a file (or object), and the location of the lookup includes a directory with the same name, a look up is performed for a file with a special name that includes the requested name and the addition 'FILENAME'.

When a S3 client requests to access a certain object having a certain name, the certain name is parsed in the same manner described for object creation, and the slashes are substituted with strings that indicates the existence of the slashes and the number of the slashes. A path that is identified by the name portions is traversed until the file at the bottom of the path is reached.

When a hierarchical filesystem client wishes to access a file that was created as an object by a S3 client—the hierarchical filesystem client can provide a pathname that includes the name portions that were described above that are chained with real slashes between the name portions. For example, referring to case f) described above, of an object that was requested to be created with the string '/d//b//c//', the hierarchical filesystem client may send an access command that includes the pathname: 'SLASH1dSLASH1/bSLASH1/cSLASH2'—which is a perfectly valid pathname in any hierarchical filesystem protocol.

FIG. 1 illustrates method 10.

Method 10 is for supporting files names in a storage system.

Method 10 may start by step 20 of receiving a first protocol request for creating an object having a requested object name that comprises one or more sets of slashes, wherein the first protocol does not use the one or more sets as hierarchy separators. Each set of slashes includes one or more consecutive slashes.

Referring to the sixth example (/d//b//c//)—the first set includes one slash, while each set of the second, third and fourth sets includes two consecutive slashes.

Step 20 may be followed by step 30 of determining a role of each set of the one or more sets in a second protocol that uses slashes as hierarchy separators, and generating a path name for accessing the object, when using either one of the first and second protocols, wherein the generating is based on the requested object name and the role of each set.

The determination may include determining a path name to be used for accessing the object when content of the object is stored in a file of a path of the storage system.

The role may be one out of a hierarchy separator and a name of a file or a directory or part of a name of a file or directory.

The role may be combination of hierarchy separator and a name of a file or a directory.

Referring to the fourth requested object name (fourth example)—//c//b—the second slash of the second set can be both a hierarchy separator and a name of a directory (when the directory name is translated to SLASH2cSLASH2)—or may only be a hierarchy separator (when the directory name is translated to SLASH2cSLASH1). Referring to the sixth example (/d//b//c//)—the first slash at the beginning of the string will serve as part of the first level directory, the set of two consecutive slashes after the 'd' serves as both—part of the first level directory (e.g., 'SLASH1dSLASH1') as well as hierarchy separator indicating to move down to the second level directory. This set of two consecutive slashes may be also served as part of the second level directory (attached to the 'b'), or any other combination. The same roles may be applied to the next set of two consecutive slashes between the 'b' and the 'c'. The last set of two consecutive slashes serves as part of a file name, e.g., 'cSLASH2'

Step 30 may include at least one out of:
a. Step 33 of using the one or more sets to segment the requested object name to at least one requested object name segment (also referred to as 'name portion').

i. The first, second and third requested object names (first till third examples) include a single requested object name segment—ab.
ii. The fourth requested object name (fourth example) includes two requested object name segments—c and b.
iii. The fifth requested object name (fifth example) includes three requested object name segments—a, b and c.
iv. The sixth requested object name (sixth example) includes three requested object name segments d, b and c.
b. Step 34 of determining a role of each set based on the locations of the set and the at least one requested object name segment.
i. In the first till third requested object names there is a single requested object name segment—so all slashes are not to be used as hierarchy separators—as there are no hierarchies.
ii. A slash of a set of slashes that is located between two requested object name segments may be used as a hierarchy separator.
iii. A slash of a set that is not located between requested object name segments should not be used as a hierarchy separator.
c. Step 35 of determining a role of each set based, at least in part, on a number of the at least one requested object name segment.
i. In the first till third requested object names there is a single requested object name segment—so all slashes are not to be used as hierarchy separators—as there are no hierarchies.
ii. If there are more than one requested object name segments—then there may be a slash that may be used as a hierarchy separator.
d. Step 36 of replacing one or more consecutive slashes of a set by a unique string (also referred to as 'special purpose string') that (i) differs from a slash, (ii) represents the set, and (iii) does not include any slash.
e. Step 37 of solving a collision between an intended segment of the path name for accessing the object and an existing segment of an existing path name for accessing the object; wherein the collision occurs when the intended segment is a requested object name segment that is intended to be stored in the same level as the existing segment, wherein the existing segment is an object name segment that was previously saved in response to a different first protocol request for creating another object. For example—when there is a collision between a file name and a name of a directory, where the second to be created, out of the two, is directed to the same level as the first. For example: a certain name segment was previously stored as a directory in a certain location as part of a previous request, and the current first protocol request causes generating the same certain name segment that is intended to be a name of a file to be stored in the same location.

Step 30 may be followed by step 40 of creating the object. This may include creating a path having the path name, wherein the path includes a file that stores at least a part of the content of the object.

The method 10 may also include receiving access requests related to the file and responding to the access request. Thus—method 10 may include (or may be followed by) one or more steps of method 200.

Figure 2:
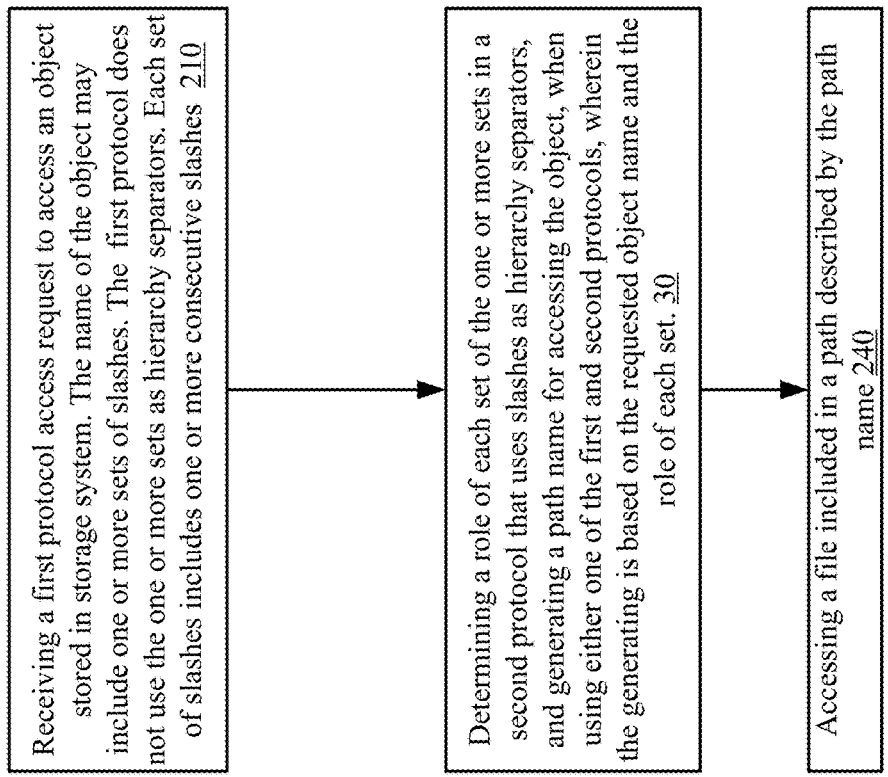
FIG. 2 is an example of a method.

FIG. 2 is an example of method 200 for supporting files names in a storage system, the method may start by step 210 of receiving a first protocol access request to access an object stored in storage system. The name of the object may include one or more sets of slashes. The first protocol does not use the one or more sets as hierarchy separators. Each set of slashes includes one or more consecutive slashes.

Step 210 may be followed by step 30 of determining a role of each set of the one or more sets in a second protocol that uses slashes as hierarchy separators, and determining a path name for accessing the object, based on the name of the object and the role of each set.

Step 30 may be followed by step 240 of accessing a file included in a path described by the path name. The following two example assume that there is no collision to solve.
a. The third example—requesting to //ab/// will result in accessing a path having a path name SLASH3abSLASH2.
b. The fifth example—requesting to access a/b/c will result in accessing a path having a path name a/b/cSLASH1.

It should be noted that when receiving a second protocol access request to access the object then the access request can be seamlessly responded to—as the access request may include the path name for accessing the object. For example, referring to the name of the fifth example—it is assumed that the second protocol access request provides the pathname 'a/b/cSLASH1'.

Any other operation related to the path may be executed by the storage system.

FIG. 9 shows an example diagram of a storage system 300 according to the disclosed embodiments.

The storage system 300 includes a number of N compute nodes 380-1 through 380-N (hereinafter referred to individually as a compute node 380 and collectively as compute nodes 380, merely for simplicity purposes, N is an integer equal to or greater than 1). The compute nodes include (or may execute) multiple compute cores each—see for example compute cores 311(1,1)-311(1,K) and compute cores 311(N,1)-311(N,K).

The storage system 300 also includes a number of M storage nodes 320-1 through 320-M (hereinafter referred to individually as a storage node 320 and collectively as storage nodes 320, merely for simplicity purposes, M is an integer equal to or greater than 1). The computer nodes 380 and the storage nodes 320 are connected through a communication fabric 390. M may equal N or may differ from N.

In an embodiment, a compute node 380 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 380 does not require any dedicated hardware A compute node 380 is configured to perform tasks related to the management of the storage nodes 320. In an embodiment, each compute node 380 interfaces with multiple client devices such as a client device 360, which may be a S3 (first protocol) client that uses S3 protocol and/or client device 361 that may be a NFS or SMB (second protocol) client, or a client of any other hierarchical filesystem protocol. The compute nodes interface the clients via one or more networks, such as network 370. To this end, a compute node 380 is configured to receive requests to create S3 objects, to access S3 created object via S3 protocol or via filesystem protocol (e.g., NFS, SMB) and promptly serve these requests in a persistent manner, as described in methods 10 and 200. The network 370 may be, but is not limited to, the Internet, the worldwide-web (WWW), a local area network (LAN), a wide area network (WAN), and the like.

In an embodiment, a compute node 380 is configured to interface with different protocols implemented by the client devices or applications (e.g., TCP/IP, HTTP, FTP, various filesystem protocols, S3 protocol etc.) and to manage the read and write operations to the storage nodes 320. The compute node 380 is further configured to address and map all elements stored in the storage nodes 320.

The compute nodes participate in executing the steps of methods 10 and 200.

In an embodiment, to efficiently read and write data to the storage nodes 320 from the physical layer, each compute node 380 performs a number of processes including data reduction, data resiliency, and Flash memory management actions (e.g., defrag, wear leveling, and so on).

It should be noted that each compute node 380 may operate in the same manner as all other compute nodes 380. In a case of a failure, any compute node 380 can replace the failed node. Further, each compute node may control and manage one or mode storage nodes 320 regardless of the specific architecture of the storage nodes 320. Therefore, there is no coupling between specific compute nodes 380 and specific storage nodes 320. As such, compute nodes can be added to the system 300 without increasing the number of storage nodes (or their capacity), and vice versa, storage nodes can be added without increasing the number of compute nodes 380.

Figure 3:
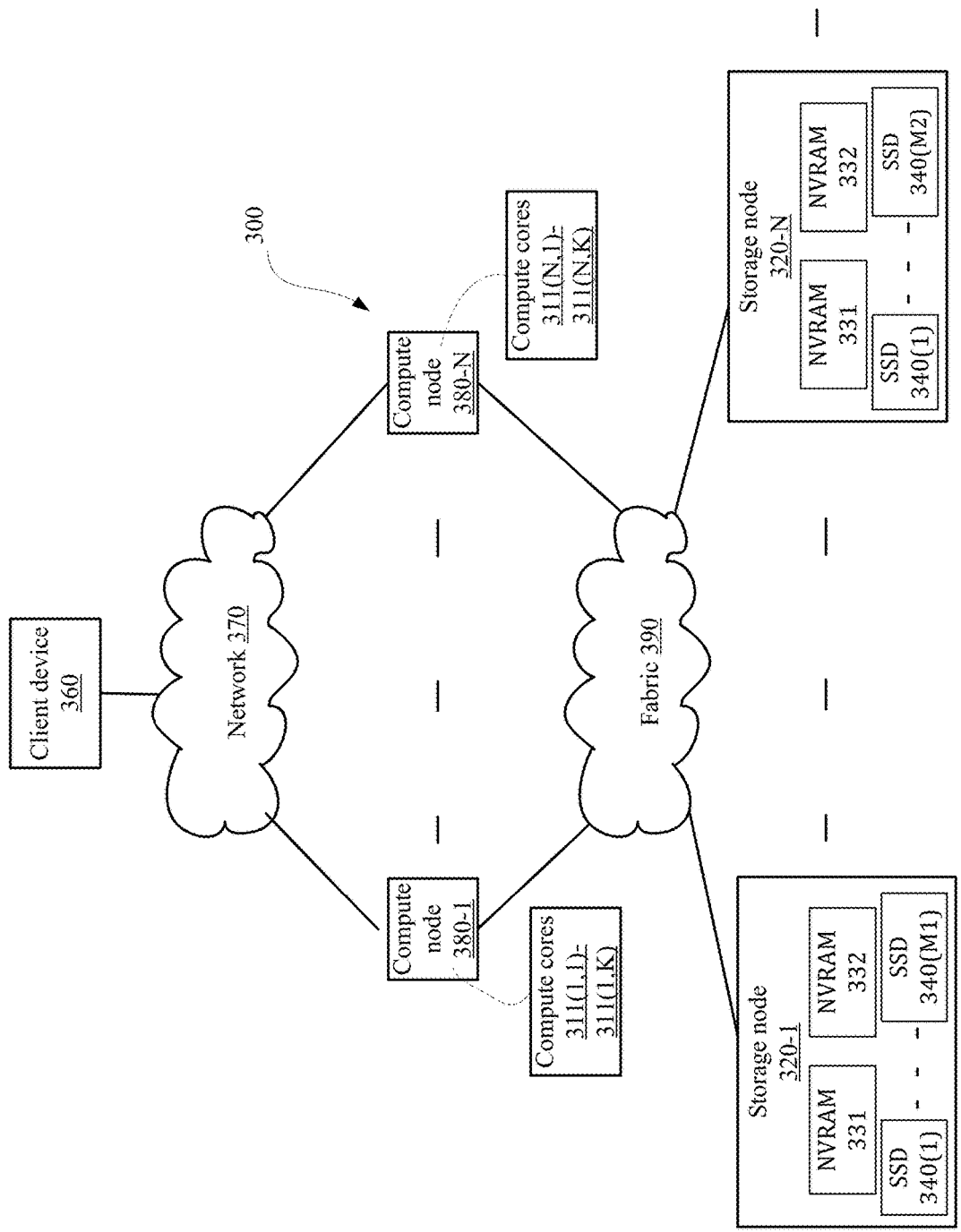
FIG. 3 is an example of a storage system.

The storage nodes 320 provide the storage and state in the system 300. To this end, each storage node 320 may include a plurality of SSDs, such as SSDs 340, for example storage node 320-1 includes M1 SSDs 340(1)-340(M1). Each storage node further includes fast accessed memory for storing the traversal task queues, such as NVRAM 331 and 332 of FIG. 3. The traversal task queues may be stored in either a volatile memory or non-volatile memory within the storage node.

The storage nodes 320 may be configured to have the same capacity as each other or different capacities from each other. In an embodiment, the data stored in each storage node 320 is made redundant internally within the storage node, made redundant at a different storage node, or both.

A storage node 320 may be configured to communicate with the compute nodes 380 over the communication fabric 390. It should be noted that each compute node 380 can communicate with each storage node 320 over the communication fabric 390. There may not be a direct coupling between a compute node 380 and storage node 320.

In the embodiment, the communication fabric 390 may include an Ethernet fabric, an InfiniBand fabric, and the like. Specifically, the communication fabric 390 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 360 is part of a compute node 380. In such a deployment, the system 300 does not communicate with an external network, e.g., the network 370. It should be further noted that the communication between the compute nodes 380 and the storage nodes 320 is facilitated over the fabric 390. It should be further noted that the compute nodes 320 can communicate with each other over the fabric 390. The fabric 390 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for supporting files names in a storage system, the method comprises:
   receiving a first protocol request for creating an object having a requested object name that comprises one or more sets of slashes, wherein the first protocol does not use the one or more sets as hierarchy separators; wherein each set of slashes comprises one or more consecutive slashes;
   determining a role of each set of the one or more sets in a second protocol that uses slashes as hierarchy separators; and
   generating a path name for accessing the object, when using either one of the first and second protocols, wherein the generating is based on the requested object name and the role of each set; wherein the generating of the path name comprises replacing one or more consecutive slashes of a set by a unique string that (i) differs from a slash, (ii) represents the set, and (iii) does not include any slash.

2. The method according to claim 1 wherein the role is selected out of a hierarchy separator and a part of a name of a file or a directory.

3. The method according to claim 1 wherein the role is selected out of (a) a hierarchy separator, (b) a part of a name of a file or a directory, or (b) both a hierarchy separator and a part of a name of a file or a directory.

4. The method according to claim 1 wherein the one or more consecutive slashes have a role of a part of a name of a file or a directory.

5. The method according to claim 1 wherein the unique string represents a number of slashes of the set.

6. The method according to claim 1 wherein the unique string represents a number of the one or more consecutive slashes.

7. The method according to claim 1 wherein at least one of the determining and the generating comprises using the one or more sets to segment the requested object name to at least one requested object name segment.

8. The method according to claim 7 wherein the determining a role of each set is based on the locations of the set and the at least one requested object name segment.

9. The method according to claim 7 wherein the determining a role of each set is based, at least in part, on a number of the at least one requested object name segment.

10. The method according to claim 1 wherein the generating comprises solving a collision between an intended segment of the path name for accessing the object and an existing segment of an existing path name for accessing the object; wherein the collision occurs when the intended segment is a requested object name segment that is intended to be stored in the same level as the existing segment, wherein the existing segment is an object name segment that was previously saved in response to a different first protocol request for creating another object.

11. The method according to claim 1 comprising creating the object, wherein the creating of the object comprises creating a path having the path name, wherein the path comprises a file that stores at least a part of the content of the object.

12. A non-transitory computer readable medium for supporting files names in a storage system, the non-transitory computer readable medium stores instructions for:
   receiving a first protocol request for creating an object having a requested object name that comprises one or more sets of slashes, wherein the first protocol does not use the one or more sets as hierarchy separators; wherein each set of slashes comprises one or more consecutive slashes;
   determining a role of each set of the one or more sets in a second protocol that uses slashes as hierarchy separators; and
   generating a path name for accessing the object, when using either one of the first and second protocols, wherein the generating is based on the requested object name and the role of each set; wherein the generating of the path name comprises replacing one or more consecutive slashes of a set by a unique string that (i) differs from a slash, (ii) represents the set, and (iii) does not include any slash.

13. The non-transitory computer readable medium according to claim 12 wherein the role is selected out of a hierarchy separator and a part of a name of a file or a directory.

14. The non-transitory computer readable medium according to claim 12 wherein the role is selected out of (a) a hierarchy separator, (b) a part of a name of a file or a directory, or (b) both a hierarchy separator and a part of a name of a file or a directory.

15. The non-transitory computer readable medium according to claim 12 wherein the one or more consecutive slashes have a role of a part of a name of a file or a directory.

16. The non-transitory computer readable medium according to claim 12 wherein the unique string represents a number of slashes of the set.

17. The non-transitory computer readable medium according to claim 12 wherein the unique string represents a number of the one or more consecutive slashes.

18. The non-transitory computer readable medium according to claim 12 wherein at least one of the determining and the generating comprises using the one or more sets to segment the requested object name to at least one requested object name segment.

19. The non-transitory computer readable medium according to claim 18 wherein the determining a role of each set is based on the locations of the set and the at least one requested object name segment.

20. The non-transitory computer readable medium according to claim 18 wherein the determining a role of each set is based, at least in part, on a number of the at least one requested object name segment.

21. The non-transitory computer readable medium according to claim 12 wherein the generating comprises solving a collision between an intended segment of the first and second protocol compliant object name and an existing segment of an existing first and second protocol compliant object name; wherein the collision occurs when the intended segment and the existing segment belong to different hierarchies.

22. The non-transitory computer readable medium according to claim 12 that stores instructions for creating the object, wherein the creating of the object comprises creating a path having the path name, wherein the path comprises a file that stores at least a part of the content of the object.

23. A storage system that comprises
storage nodes; and
compute nodes;
wherein at least one compute node is configured to:
    receive a first protocol request for creating an object having a requested object name that comprises one or more sets of slashes, wherein the first protocol does not use the one or more sets as hierarchy separators; wherein each set of slashes comprises one or more consecutive slashes;
    determine a role of each set of the one or more sets in a second protocol that uses slashes as hierarchy separators; and
    generate a path name for accessing the object, when using either one of the first and second protocols, wherein the generating is based on the requested object name and the role of each set; wherein the generating of the path name comprises replacing one or more consecutive slashes of a set by a unique string that (i) differs from a slash, (ii) represents the set, and (iii) does not include any slash.

24. A method for supporting files names in a storage system, the method comprises:
receiving a first protocol access request to access an object stored in storage system; wherein a name of the object comprises one or more sets of slashes, wherein the first protocol does not use the one or more sets as hierarchy separators; wherein each set of slashes comprises one or more consecutive slashes;
determining a role of each set of the one or more sets in a second protocol that uses slashes as hierarchy separators;
determining a path name for accessing the object, based on the name of the object and the role of each set; wherein the determining comprises replacing the one or more consecutive slashes of each set by a unique string that (i) differs from a slash, (ii) represents the set, and (iii) does not include any slash; and
accessing a file included in a path described by the path name.

* * * * *